Oct. 17, 1933.    T. LAURENT    1,930,758

ELECTRICAL RECTIFYING DEVICE

Filed Dec. 28, 1927

T. Laurent
INVENTOR

By Marks & Clerk
Attys.

Patented Oct. 17, 1933

1,930,758

UNITED STATES PATENT OFFICE 1,930,758

ELECTRICAL RECTIFYING DEVICE

Torbern Laurent, Stockholm, Sweden, assignor to Telefonaktiebolaget L. M. Ericsson, Stockholm, Sweden, a company of Sweden Application December 28, 1927, Serial No. 243,116, and in Sweden January 4, 1927

7 Claims. (Cl. 175—320)

The present invention refers to improvements in electric rectifying arrangements and is particularly intended to be applied to electrostatic relays for instance in signalling systems for the purpose of operating such relays by means of electric oscillations or alternating currents. For similar purposes it has previously been proposed to use thermionic valves adapted to rectify and amplify the oscillations before supplying the latter to the relay. Arrangements of this kind are, however, rather expensive and complicated and do not comply with the requirements of the practice as regards reliability.

The main object of this invention is to provide such operating means for electrostatic relays which fulfil the conditions of the practice in a more perfect manner than has been possible heretofore. To this end a new means for rectifying electric oscillations or alternating currents is made use of. This means consists of a discharge device capable of independent discharge, for instance a glow-lamp or a number of glow-lamps, in combination with an auxiliary source of current inserted into the circuit of the discharge device, the voltage of said source of current being per se insufficient to cause discharge through the discharge device. The latter will thus normally form an interruption of the circuit but may be caused, by superimposing upon the auxiliary voltage the oscillations to be rectified, to close the circuit for current impulses having the same direction as the auxiliary voltage. Preferably, a D. C. voltage somewhat lower than the lighting voltage of the discharge device is made use of as the auxiliary voltage. When superimposing an A. C. voltage, for instance a signal current voltage, on said auxiliary D. C. current voltage, the instantaneous value of the resulting voltage may exceed the lighting voltage, the discharge device being thus caused to operate as a rectifying device. The rectified current impulses are suitably utilized to charge a condenser thereby establishing a D. C. voltage by means of which the electrostatic relay may be operated. The new rectifying device according to the invention may be used also in other manner than in connection with electrostatic relays, which application forms, however, the main object of the invention.

Figure 1:
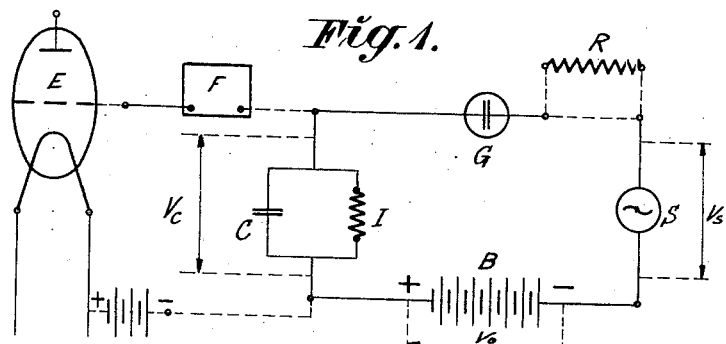
Figures 2, 3:
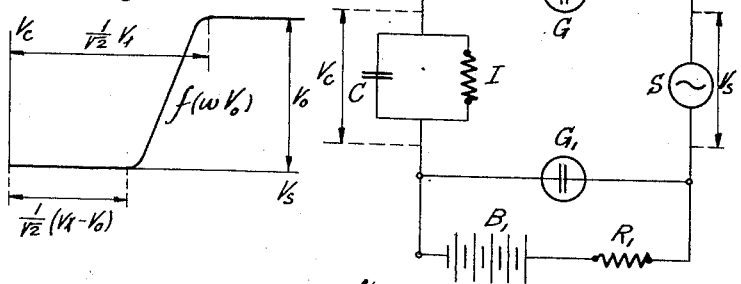
Figure 4:
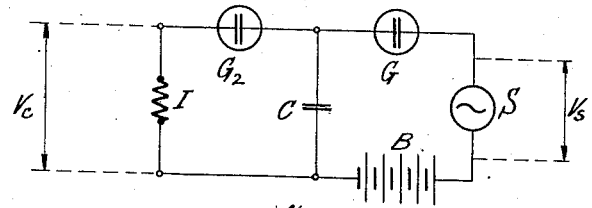
Figure 5:
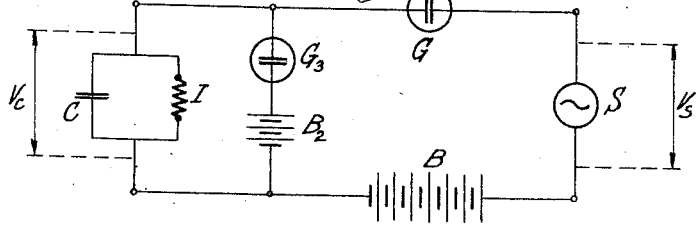

The invention will be more closely described with reference to the accompanying drawing. Figure 1 is a diagram illustrating the principle upon which the invention is based, the electrostatic relay being represented by a thermionic valve relay. Figure 2 is a diagram of the effective D. C. voltage of the condenser in Figure 1 as a function of the A. C. voltage. Figures 3 to 5 illustrate modifications of the arrangement according to Figure 1.

In the embodiment according to Figure 1 a condenser C is connected in series with a grid potential battery between the cathode and the grid of a thermionic valve E which is adapted to serve as an electrostatic relay. The condenser C is, on the other hand, connected in the circuit of a glow lamp G which further includes a storage battery L of a voltage $V_0$ which is somewhat lower than the lighting voltage $V_t$ of the glow lamp. In the circuit are also provided means S for producing an A. C. voltage which will, accordingly, be superimposed upon the D. C. voltage of the battery B. Said means S may for instance consist of a transformer connecting the circuit of the glow-lamp with a telephone line. The condenser C is connected in parallel with a leak resistance I which serves to cause discharge of the condenser C and thereby to restore the voltage of the grid to its normal value after the relay has been operated. The resistance I obviously acts in the same manner as an ordinary grid leak. In the grid circuit of the valve E is inserted an apparatus F of any suitable kind.

The glow lamp has the characteristic quality of starting the discharge when the voltage between the electrodes has attained a definite value $V_t$, the so called lighting voltage.

Before the tension has attained the above mentioned voltage the circuit is open and the tube acts as a complete interruption, but after the luminous phenomenon has begun the circuit is closed. As soon as the discharge takes place the voltage of the tube goes down somewhat to the so called discharge voltage. The difference between the lighting and the discharge voltage can be considered as negligible for this special case and in the following we make the simplified assumption that the lighting voltage $V_t$ is equal to the discharge voltage.

The discharge voltage of the lamp is constant i. e. independent of the discharging current. This means on the other hand that currents produced by E. M. F.'s super-imposed upon the discharge voltage can be considered as short-circuited between the electrodes.

Assume that the device S is producing a sinusoidal-formed A. C. voltage $V_s$ superimposed upon the voltage $V_0$ of the battery B. If the polarity is according to the diagram, the resultant voltage can reach an instantaneous value of $$V_0 + \sqrt{2} \cdot V_s$$

with the negative pole on the right side of the glow-lamp.

The discharge begins when $$V_o + \sqrt{2} \cdot V_s \geq V_t$$

As the glow-lamp cannot absorb a larger voltage drop than $V_t$, the difference $$V_o + \sqrt{2} V_s - V_t$$

must be taken up by the condenser C. That results in a negative charge on the upper pole of the condenser.

The result is an instantaneous voltage on the condenser of $$V_{c1} = V_o + \sqrt{2} \cdot V_s - V_t$$

Next instant the A. C. voltage decreases and the discharge voltage $V_t$ cannot be maintained. The result is that the light goes out and the circuit is interrupted.

In the meantime $t$ until the next charge takes place, the condenser voltage is decreased to $$V_{c2} = V_{c1} \cdot e^{-\frac{t}{CI}}$$

where I represents the resistance of the grid leak. Afterwards the condenser is again charged to the value $V_{c1}$.

It has to be observed that this voltage cannot exceed $V_o$.

In the manner described a voltage is successively built up between the terminals of the condenser C and in consequence thereof the biasing voltage of the relay E is displaced towards the positive side so as to cause an anode current to flow whereby the signalling device connected to the relay E is operated. It should be observed that the cyclic variations of the alternating current source S do not directly cause any essential action of the relay E which is only actuated by the accumulation of the charge of the condenser C.

If a resistance R is connected in series with the glow-lamp as indicated in Figure 1, the system has a certain inertia when charging i. e. the voltage of the condenser increases to the value $V_{c1}$ first after several charges. At very high frequencies this value is never reached.

If the inertia at the discharge of the condenser is so large that the discharge between two consecutive charges can be disregarded the following relations are valid between the effective D. C. voltage $V_c$ of the condenser and the A. C. voltage $V_s$. These relations are a direct result of the above mentioned points. $\omega$ indicates the angular frequency of the alternating current.

If $$V_s < \frac{1}{\sqrt{2}}(V_t - V_o); \quad V_c = 0$$

If $$V_s = \frac{1}{\sqrt{2}}(V_t - V_o); \quad V_c = 0$$

If $$\frac{1}{\sqrt{2}} \cdot V_t > V_s > \frac{1}{\sqrt{2}}(V_t - V_o); \quad V_o > V_c > 0; \quad V_c = f(\omega, V_o)$$

If $$V_s = \frac{1}{\sqrt{2}} \cdot V_t; \quad V_c = V_o$$

If $$V_s > \frac{1}{\sqrt{2}} \cdot V_t; \quad V_c = V_o$$

The diagram indicating the relation between the condenser voltage $V_c$ and $V_s$ has the appearance as indicated in Figure 2.

At the arrangement according to Figure 3 the source of the direct current consists of the voltage drop at a glow-lamp $G_1$ fed with current from a battery $B_1$ connected in series with a resistance $R_1$. Other marks are according to Figure 1. The lamps are selected so that the glow-lamp $G_1$ has a somewhat lower discharge voltage than the lighting voltage of the glow-lamp G. The voltage of the battery $B_1$ is higher than the lighting voltage of the glow-lamps. The result is that the lamp $G_1$ is continuously luminous whereas the lamp G is discharging only superimposed A. C. voltages from the device S.

The purpose with this arrangement is to obtain a D. C. voltage of a definite value in the discharge circuit. This voltage is within certain limits independent of the variations in the voltage of the battery $B_1$.

At the arrangement indicated in Figure 4 the leak resistance I is connected in series with a glow-lamp $G_2$. The voltage $V_c$ for the grid circuit of the vacuum tube consists only of the partial voltage on the leak resistance I. Other marks are according to Figure 1. The inertia when reestablishing the grid voltage after the cessation of the alternating current is hereby greatly reduced.

At the arrangement according to Figure 5 the condenser C is connected in parallel with a glow-lamp $G_3$ in series with the battery $B_2$ of a definite voltage. Other marks are according to Figure 1.

With this arrangement the voltage of the condenser $V_c$ can be limited to a certain maximum value that is below the voltage of the battery B. This limitation is evidently also valid for instantaneous voltages. For all the above mentioned arrangements the electrostatic relay has been indicated as a thermionic valve with a grid voltage that is actuated by alternating current. It is evidently of no importance for the principle of the invention how the relay is arranged. It can for instance just as well consist of relay that is actuated by the electrostatic attraction (for instance according to the Swedish Patent No. 55,510). On the other hand the arrangement according to the invention may also be used as a rectifying device in connection with other electrical apparatus, for instance in connection with signal receiving devices of different kinds, radio receiving sets or the like.

I claim:

1. A device for operating an electrostatic relay by means of electric oscillations, comprising in combination a condenser associated with the entering side of the relay, a discharge device capable of independent discharge and having substantially equal electrodes, an auxiliary source of current connected up together with said condenser in the circuit of said discharge device, the voltage of said auxiliary source of current being lower than the lighting voltage of said discharge device, and means for superimposing electric oscillations so as to build up a constant direct current input voltage for operating said relay upon said auxiliary voltage.

2. A device for operating an electrostatic relay by means of electric oscillations, comprising in combination a condenser associated with the entering side of the relay, a glow lamp having substantially equal electrodes, an auxiliary source of current connected up together with said condenser in the circuit of said glow lamp, the voltage of said source of current being lower than the lighting voltage of said glow lamp and means for superimposing electric oscillations so as to build up a constant direct current input voltage for operating said relay upon said auxiliary voltage.

3. A device for operating an electrostatic relay by means of electric oscillations, comprising in combination a discharge device capable of independent discharge and having substantially equal electrodes, an auxiliary source of current, the voltage of which is lower than the lighting voltage of said discharge device, and means for superimposing electric oscillations for operating said relay upon said auxiliary voltage, a condenser connected up together with said auxiliary source of current in the circuit of said discharge device and associated with the entering side of the relay in such a manner as to cause the direct current voltage built up in the condenser upon operation of the discharge device by said oscillations to modify the direct current voltage upon which the operation of the relay depends.

4. A device for operating an electrostatic relay by means of electric oscillations, comprising in combination a discharge device capable of independent discharge and having substantially equal electrodes, an auxiliary source of current the voltage of which is lower than the lighting voltage of said discharge device, a condenser connected up together with said auxiliary source of current in the circuit of said discharge device and shunted across the entering side of the relay, and means for superimposing electric oscillations so as to build up a constant direct current input voltage for operating said relay upon said auxiliary voltage.

5. A device for operating a relay by means of electric oscillations, comprising in combination a condenser, associated with the entering side of the relay, a first glow lamp connected in series with said condenser, a second glow lamp having a lower lighting voltage than the first glow lamp and connected in series with said condenser and said first glow lamp, an auxiliary source of current connected with a series resistance across the terminals of said second glow lamp, and means for superimposing electric oscillations upon the terminal voltage of said second glow lamp for operating the electrostatic relay.

6. A device for operating a relay by means of electric oscillations, comprising in combination a condenser associated with the entering side of the relay, a first glow lamp connected in series with said condenser, an auxiliary source of current connected together with said condenser in the circuit of said first glow lamp, the voltage of said source of current being lower than the lighting voltage of said first glow lamp, a second glow lamp connected between the condenser and the entering side of the relay, a leak resistance connected across the input side of the electrostatic relay, and means for superimposing electric oscillations upon said auxiliary voltage for operating said relay.

7. A device for operating a relay by means of electric oscillations, comprising in combination a condenser associated with the entering side of the relay, a first glow lamp, an auxiliary source of current connected up together with said condenser in the circuit of said first glow lamp, the voltage of said source of current being lower than the lighting voltage of said first glow lamp, and means for superimposing electric oscillations for operating said relay upon said auxiliary voltage, and a second glow lamp in order to limit the condenser voltage to a certain maximum value.

TORBERN LAURENT.